United States Patent Office 3,143,694
Patented Aug. 4, 1964

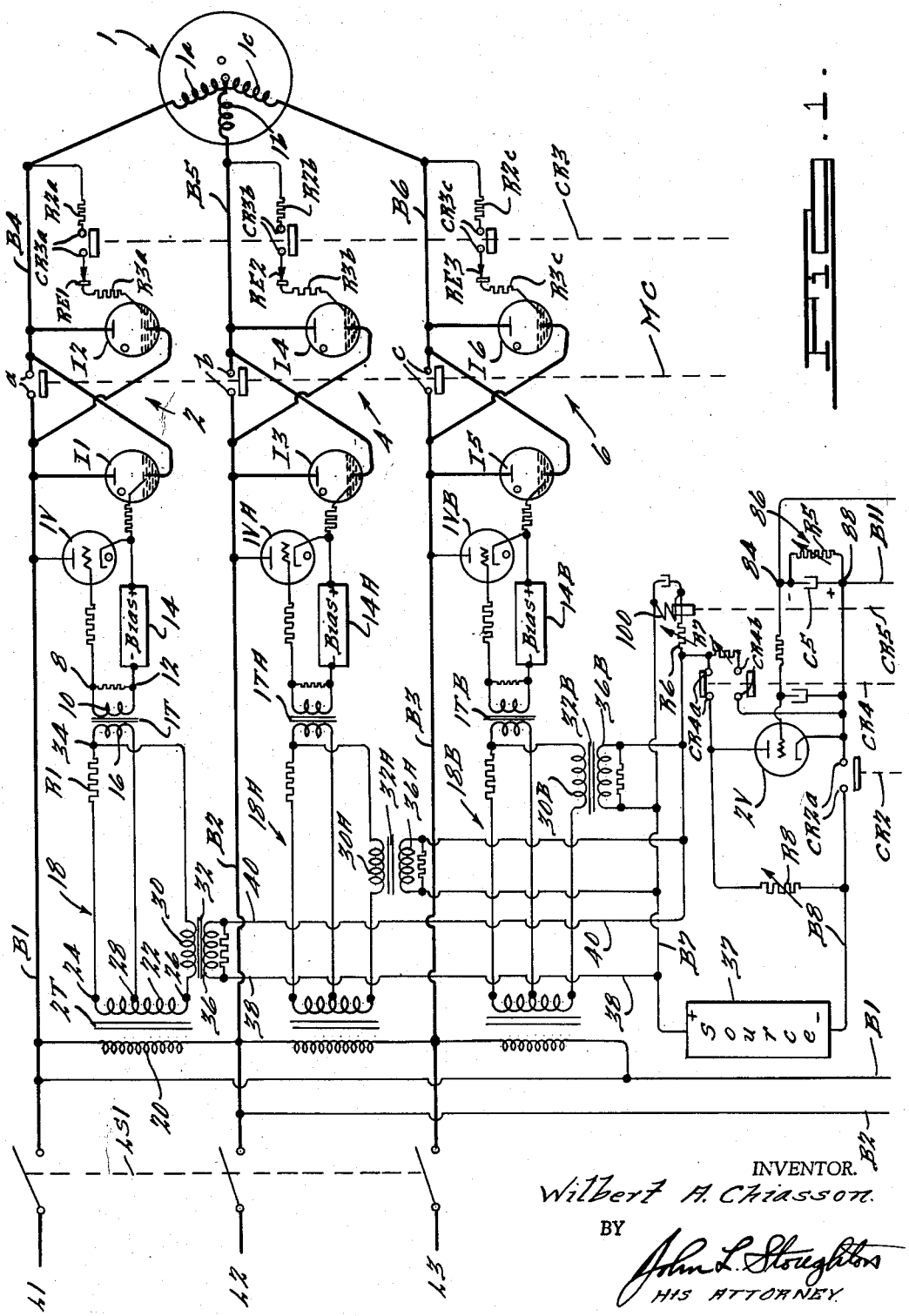

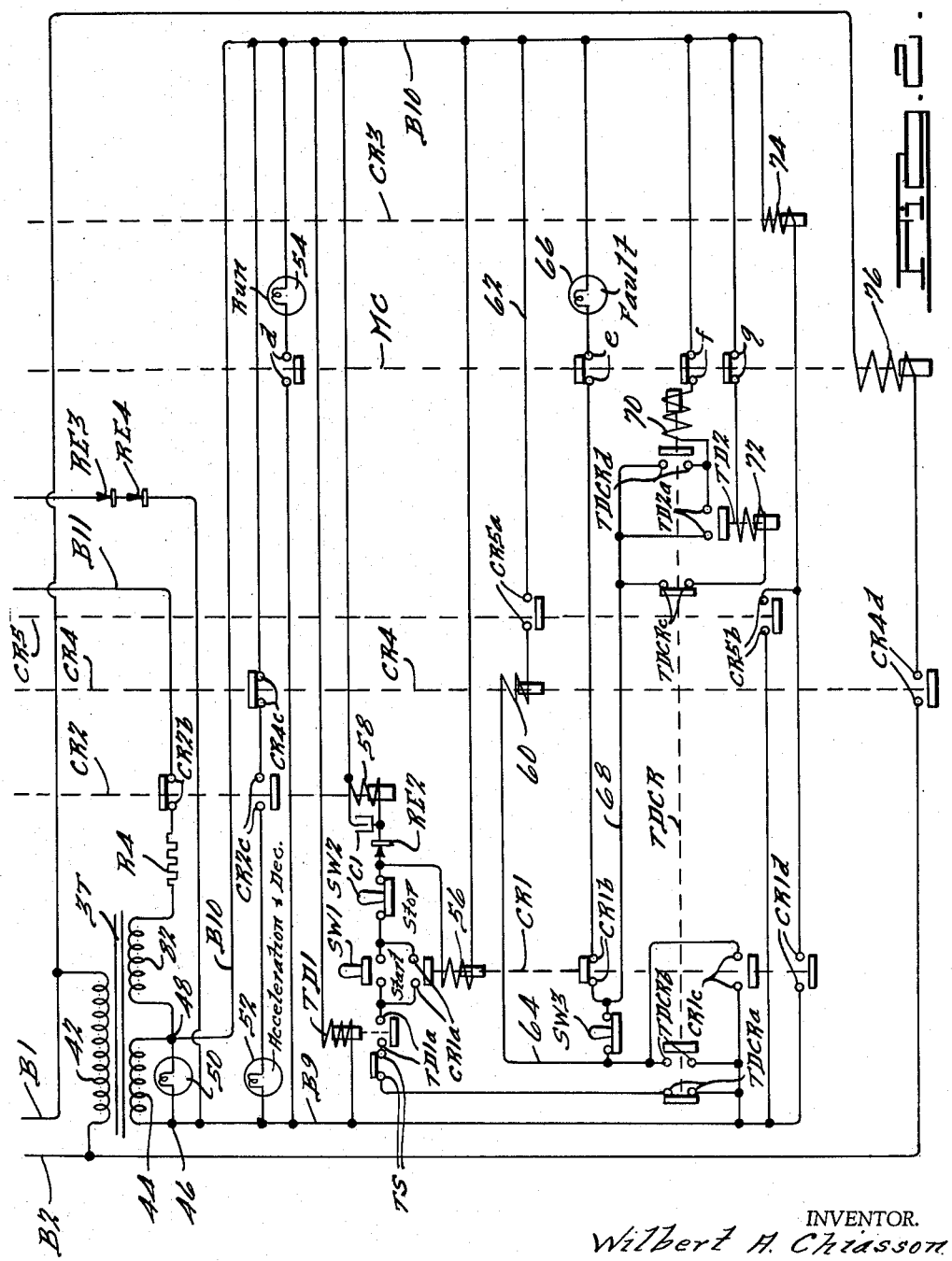

3,143,694
MOTOR CONTROLLING APPARATUS
Wilbert A. Chiasson, Walled Lake Township, Oakland County, Mich., assignor to Weltronic Company, a corporation of Michigan
Filed Sept. 16, 1957, Ser. No. 684,094
17 Claims. (Cl. 318—227)

This invention relates generally to motor controlling apparatus and, more particularly, to such an apparatus using discontinuous discharge valves, preferably ignitrons, for starting high horsepower electric motors.

Principal objects of the present invention are to provide apparatus for supplying a polyphase motor from a polyphase source, in which a pair of reversely connected ignitrons or other discontinuous discharge valves are interposed in each line conductor leading to the motor, in which the firing means for one valve of each such pair is adjustable so that the firing thereof can occur either early or late in half periods of the source in which the anodes of such one valves are positive, and in which the firing means for the other valve of each such pair is variable but is set to cause the firing thereof as soon as sufficient anode potential is applied to such other valves; to provide such apparatus embodying improved phase shift control means for varying the firing points of the aforesaid first-mentioned valves of each pair, to provide such apparatus in which such phase shift control means is automatically varied in accordance with a predetermined pattern, so as to progressively increase the voltage impressed upon the motor during starting; to provide such apparatus in which, under running conditions, the aforesaid valves are by-passed by contactor mechanism which closes when the motor has come up to speed and embodying control means effective under stopping conditions to insure that the motor load is re-transferred to the valves before the contactor mechanism opens; and to provide such apparatus embodying improved control means which stops the motor and, until reset, prevents restarting thereof, in the event the aforesaid contactor mechanism fails to close at the conclusion of an accelerating operation.

Other objects of this invention will be apparent from the specification, the appended claims and the drawings, in which:

FIGURES 1 and 2, when placed side by side collectively schematically illustrate a motor starting apparatus embodying the invention.

Referring to the drawings, the numeral 1 indicates generally an electric motor of relatively high horsepower energizable from a three phase source of alternating current as illustrated by the supply lines L1, L2, and L3. These lines are selectively connectible by means of a disconnect switch LS1 to busses B1, B2, and B3 respectively. The busses B1, B2, and B3 are connected respectively to busses B4, B5, and B6 through pairs of back-to-back or anti-parallel connected pairs of ignitrons 2, 4, and 6. Pair 2 comprises the ignitrons I1–I2; the pair 4, the ignitrons I3–I4; and the pair 6, the ignitrons I5–I6. The anodes of the ignitrons I1, I3, and I5 are respectively connected to the busses B1, B2, and B3 while their cathodes are connected respectively to the busses B4, B5, and B6, which are directly connected to the input of motor 1. The ignitrons I2, I4, and I6 are connected between the busses B1–B4; B2–B5; and B3–B6 in reverse relationship with respect to the ignitrons I1, I3, and I5 respectively, so that current may flow in either direction through the pairs of ignitrons. The busses B1–B4, B2–B5, and B3–B6 are individually and directly connectible together by means of the contacts a, b, and c of the motor controlling switch MC.

The pairs of ignitrons 2, 4, and 6 are similarly energized and therefore a detailed description of only the pair 2 will be given, it being remembered that the pairs 4 and 6 are specifically the same, the only difference being that they are connected to different phases of the source. The ignitron I1 is fired by means of a firing tube 1V, the anode of which is connected to the bus B1 and the cathode of which is connected through a current limiting resistor to the igniter of the ignitron I1. The firing valve 1V may be of the discontinuous control type, such as a thyraton, and the initiation of conduction therethrough is determined by means of a bias voltage applied between ts controlling grid and cathode. The controlling grid of the valve 1V is connected through the usual grid current limiting resistor to common terminal 8 of the secondary winding 10 of a control transformer 1T. The other terminal 12 of this winding 10 is connected through a source 14 of blocking bias potential to the cathode of the tube 1V. The primary winding 16 of the transformer 1T is connected to a phase shifting circuit generally designated 18. This phase shifting circuit may, generally, be of any suitable type, but preferably comprises a transformer 2T having a primary winding 20 connected between the lines L1 and L2 and a secondary winding 22 having end terminals 24 and 26 and center tap connection 28. The terminal 24 is connected through a resistor R1 and controlled winding 30 of a saturable inductive device 32 to the other terminal 26. One terminal of the primary winding 16 of transformer 1T is connected to the common terminal 34 between the resistor R1 and winding 30, while the other terminal of the primary winding 16 is connected to the center tap connection 28. As will be apparent to those skilled in the art, the voltage supplied to the transformer 1T may be phase shifted relative to the voltage supplied to the primary 20 of the transformer 2T by changing the relative magnitudes of the resistor R1 and inductance of the inductive device 32.

The inductance of the inductive device 32 is controlled by controlling the amount of direct current flowing through its control winding 36. Winding 36 is connected by means of a first conductor 38 to a positive direct current supply bus B7 and the other terminal of the control winding is connected by means of a second conductor 40 through a high vacuum type control tube 2V and a starting resistor R8 to the negative direct current bus B8. The amount of direct current flow through the winding 36 and, consequently, the inductance of the winding 32 may be controlled by controlling the bias between the grid and cathode of the vacuum valve 2V. It will be apparent that by properly controlling the conductivity of valve 2V, and the value of resistor R8, the valve 1V may be made to conduct at any desired point in the voltage wave supplied between the anode and cathode of the ignitron I1.

The point of firing of the ignitron I2 is a function of the open circuit voltage across its main electrodes, as determined by the potential or charge appearing at the input terminal of motor winding 1a. Its igniter circuit extends from the bus B4 through a first current limiting resistor R2a through the contacts CR3a of a control relay CR3, a rectifier device RE1, which may be of the dry disk type, through a second current limiting resistor R3a, to the igniter. It will be apparent that when the contacts CR3a are open, no firing potential may be supplied to the ignitron I2.

The ignitron I1 is normally nonconductive even during half cycles in which its anode is positive with respect to its cathode since its energizing circuit extends from the bus B1 through the valve 1V, the current limiting resistor connected therebetween and the igniter of the ignitron I1, the bus B4, the windings of the motor 1, to the busses B5 and B6. The busses B5 and B6 are respectively disconnected from the busses B2 and B3 by the nonconducting ignitrons I4 and I6 and the open contacts CR3b and CR3c which connect the busses B5–B2 and B6–B3 through the igniters of the ignitrons I4 and I6. The busses B5 and B6 are also disconnected from the busses B2 and B3 by means of the contacts b and c of the motor control relay MC. The anode-cathode connections of valves IVA, IVB, I3 and I5 are such that they cannot complete an energizing circuit through valve IV. The ignitron I1 therefore cannot conduct due to the open anode circuit of its firing valve 1V even though the valve 1V is biased into firing condition once during each half cycle in which bus B1 is positive.

The circuit for controlling the conductivity of the valve 2V which controls the phase shifted output of the circuit 18, is shown in FIG. 2. The anode potential for valve 2V is supplied from a potential supplying transformer 3T having its primary winding 42 connected between the busses B1 and B2. The main secondary winding 44 of the transformer 3T has one terminal 46 thereof connected to a first bus B9 and its second terminal 48 connected to the bus B10. An indicating lamp 50 connected between the terminals 46 and 48 indicates, when lighted, that the transformer 3T is energizing the busses B9 and B10. An indicating lamp 52 has one terminal thereof connected to the bus B9 and its other terminal connected through the normally open contacts CR2c of a control relay CR2 and the normally closed contacts CR4c of a control relay CR4, to the bus B10. A third indicating lamp 54 is connected between the busses B9 and B10 through contacts d of motor control switch MC.

A time delay relay TD1 is connected between the busses B9 and B10 and acts, subsequent to a predetermined time interval after energization of the busses B9 and B10, to close its contacts TD1a which, if the usual overload contacts TS are closed, renders the starting of the motor 1 subject only to closure of the starting switch SW1. More particularly, one of the contacts of the thermal switch TS is connected to the bus B9 through the normally closed contacts TDCRa of the time delay control relay TDCR. The other contact of the thermal switch TS is connected through the contacts TD1a of the time delay relay TD1, the normally open contacts of the start switch SW1, the normally closed contacts of the stop switch SW2, and the energizing winding 56 of a control relay CR1 to the bus B10. The relay CR1 is provided with normally open locking contacts CR1a which are connected in parallel with the switch SW1 which, after initial operation of the relay CR1, may be opened without interruption of the operation of the motor 1.

The closure of the switch SW1 also completes a circuit from the bus B9 through switch SW2, as above described, and then through a rectifier RE2, which may be of the dry disk type, and the energizing winding 58 of the control relay CR2, to the bus B10. A timing capacitor C1 is connected in shunt with the winding 58 and, as will be described below, serves to maintain the relay CR2 energized for a short time interval subsequent to opening of the connection between the winding 58 and the bus B9.

The relay CR4 is provided with an energizing winding 60, one terminal of which is connected through the normally open contacts CR5a of the relay CR5 and conductor 62 to the bus B10, and the other terminal of which is connected through the conductor 64 and the normally open contacts TDCRb of the relay TDCR to the bus B9. The coil 100 of relay CR5 is connected in parallel with the previously mentioned phase shifting winding 36, and the other related windings 36A and 36B, and consequently the energizing current received by winding 100 is also determined by the phase shifting valve 2V and resistor R8. An indicating lamp 66 is connected between the bus B10 and the conductor 64 through a normally closed reset switch SW3, the normally closed contacts CR1b of the relay CR1 and the normally closed contacts e of the motor control switch MC. A conductor 68 is connected to the conductor 64 through the normally closed reset switch SW3, and is also connected to the energizing winding 70 of the relay TDCR through the normally open contacts TDCRd of the relay TDCR and the normally open contacts TD2a of the time delay relay TD2. In the event that the relay TDCR becomes energized by actuation of the time delay relay TD2 and closure of its contacts TD2a, closure of the locking contacts TDCRd will keep relay TDCR energized irrespective of the continued energization of the time delay relay TD2.

The energizing winding 72 of the time delay relay TD2 is connected between the bus B10 and the conductor 68 through normally closed contacts TDCRc and contacts g of the motor control relay switch MC. The relay CR3 is provided with an energizing winding 74 which is connected between the busses B9 and B10 through the normally open contacts CR1d connected in parallel with the normally open contacts CR5b of the control relay CR5, and will, of course, become energized upon closure of either or both of the just-mentioned sets of contacts. The motor control switch MC is provided with an energizing winding 76 which is connected between the busses B1 and B2 through the normally open contacts CR4e of the relay CR4.

It is believed that the remainder of the details of construction may best be described from a description of operation of the motor control, which is as follows:

The apparatus is conditioned for operation by closure of the line switch LS1, which energizes the busses B1, B2, and B3 from the lines L1, L2, and L3, which are connected to a suitable source of three phase alternating potential supply. The energization of the busses B1, B2, and B3 energizes the phase shifted networks 18, 18A, and 18B respectively connected between the busses B1–B2; B2–B3; and B3–B1 whereby the transformers 1T, 1TA, and 1TB respectively energized by these phase shifting networks will be energized to supply an alternating bias potential to the control circuits of the firing valves 1V, 1VA, and 1VB respectively, whereby they are biased into conductive condition at predetermined points in the voltage waves applied to the ignitrons I1, I3, and I5. As above described, no current can flow through the valves 1V, 1VA, and 1VB because of the open condition of the contacts a, b, and c of the motor control relay MC and the open condition of the contacts CR3a, CR3b, and CR3c of the control relay CR3. Likewise, due to the open condition of these last-named contacts of the relay CR3, the ignitrons I2, I4, and I6 cannot be rendered conducting. Energization of the busses B1 and B2 energizes the transformer 3T which in turn energizes the busses B9 and B10. Such energization of the busses B9 and B10 is indicated by the lamp 50 which will be illuminated.

When the transformer 3T is energized, the voltage which is developed across its additive series windings 44 and 82 is applied across a series circuit including the current limiting resistor R4, the normally closed contacts CR2b of the relay CR2, bus B11, parallel R-C timing network 86, and one or more series arranged dry disk rectifiers RE3 and RE4, causing capacitor C5 in the R-C network 86 to become charged. The terminal 88 of the R-C network 86 is connected to the cathode of the valve 2V and the other terminal 84 thereof is connected through the usual current limiting resistor to the grid of this tube 2V. The potential across this timing network 86 determines the bias potential of, and consequently the magnitude of current conducted by, the valve 2V. The rectifiers RE3 and RE4 are arranged in such polarity that with the contacts CR2b closed, the network 86 will be charged with terminal 88 positive with respect to the terminal 84. The magnitude of this charging potential is such that the grid is driven considerably below the cut-off bias point of the valve 2V for a purpose which will be brought out below. Additionally, conduction through tube 2V is prevented since the plate circuit thereof is open at contacts CR2a. Consequently, the only direct current flowing through the control windings 36, 36A, and 36B of the variable inductive reactive devices 32, 32A, and 32B respectively associated with the phase shifting networks 18, 18A, and 18B, and through winding 100 of control relay CR5 is that which passes through variable resistor R8 connected in shunt with the valve 2V. This current is insufficient to operate relay CR5.

With minimum current flowing through the windings 36, 36A, and 36B, the output potential of the transformers 1T, 1TA, and 1TB will be phased to provide for a firing bias potential on the valves 1V, 1VA and 1VB at times late in the positive voltage waves applied to the ignitrons I1, I3, and I5. Many times, 90° is sufficient; however, at other times a lesser or greater delay is satisfactory. The greater the delay, the less the initial current flow to the motor 1.

When the busses B9 and B10 are energized, time delay relay TD1 starts to time out. After a predetermined time delay, the relay TD1 closes its contacts TD1a. This interval of TD1 allows time for the various valves to heat up to their operating temperature before closure of the switch SW1 will permit a motor starting operation. In the interest of simplicity, the heater circuits for the various valves are not illustrated. Such circuits are conventional. As long as the switch SW1 is maintained in open position, the apparatus will remain in the above described condition, in readiness for a motor starting operation.

When it is desired to start the motor 1, the switch SW1 is momentarily closed to complete the energizing circuits for the windings 56 and 58 of the control relays CR1 and CR2. When relay CR1 becomes energized, it closes its contacts CR1a which completes a lock-in circuit which shunts the switch SW1 which may now be opened without interrupting operation of the motor 1. Closure of the contacts CR1c connects the conductor 68 to the bus B9 through switch SW3 whereby the energizing winding 72 of the time delay relay TD2 is energized to initiate its timing operation. In normal events, this winding 72 will be deenergized, before timing out occurs, due to the opening of the contacts g of the motor control switch MC. If, however, the switch MC should fail to be energized to shunt out the ignitron pairs 2, 4, and 6 and place the motor 1 directly across the busses B1, B2, and B3, in the manner to be described, the relay TD2 will time out and shut the apparatus down. This operation is described below.

Closure of the contacts CR1d completes the energizing circuit for the winding 74 of the control relay CR3 which thereupon closes its contacts CR3a, CR3b, and CR3c. Closure of these contacts completes the igniter circuits for the ignitrons I2, I4, and I6, which action initiates current flow, at a minimum rate, to the motor 1.

More particularly, assuming that the closure of relay contacts CR3a, CR3b, and CR3c occurs at a time when line B1 is positive relative to lines B2 and B3, anode potential tending to fire valve 1V is applied thereto through a circuit extending from line B1, valve 1V, the igniter and cathode of ignitron I1, phase winding 1a of motor 1 and thence, through either one or both of motor windings 1b and 1c to lines B2 and B3. The circuit branch through winding 1b extends through current limiting resistor R2b, contacts CR3b, rectifier RE2, resistor R3b, and the igniter and the cathode of ignitron I4 to line B2. The circuit through winding 1c is similar to that first traced for winding 1b, as will be obvious.

As previously described, late in the interval during which line B1 is positive relative to the lines B2 and B3, valve 1V is biased into conducting condition by transformer 1T. At this time, current flow is initiated through the just traced circuits, through valve 1V and the igniter-cathode circuits of ignitrons I1, I4, and I6. This action fires ignitrons I1, I4, and I6 and initiates flow of current to motor windings 1a, 1b, and 1c.

A short time later, but in the interval during which line B2 is positive relative to lines B1 and B3, transformer 1TA biases valve 1VA into conductive condition, whereupon current flows through it and the igniter-cathode circuits of ignitrons I3, I2, and I6, through circuits similar to those traced above relative to conduction through valve 1V, thereby firing ignitrons I3, I2, and I6 and causing further flow of current to motor windings 1a, 1b, and 1c. Similarly, late in the interval during which line B3 is positive relative to lines B1 and B2, transformer 1TB causes the firing of valve 1VB and the consequent firing of ignitrons I5, I2, and I4, through circuits similar to those traced in detail above for the other firing valves and ignitrons, and causing further flow of current to the motor. Depending upon load conditions and the lateness of the firing points, as starting, of valves 1V, 1VA and 1VB, the pulses of current supplied the motor may be continuous, or may be separate and discrete. As the firing points are advanced, during acceleration, current flow to the motor becomes continuous.

As previously indicated, the operation of the thyratons 1V, 1VA and 1VB is controlled by the phase shifting circuits 18, 18A, and 18B which in turn are under the control of the vacuum valve 2V. Initially, valve 2V is baised completely off by the network 86 and also its anode circuit is open at the contacts CR2a. When the relay CR2 became energized as a consequence of the closure of the switch SW1, its normally open contacts CR2a and CR2c closed and its normally closed contacts CR2b opened. Closure of the contacts CR2a completed the anode circuit for the vacuum valve 2V and rendered conduction therethrough subject to its grid to cathode bias. As explained above, this bias, furnished by the R-C timing network 86, is initially sufficient to bias the valve 2V below its cut-off point. Opening of the contacts CR2b terminates further flow of charging current to the R-C timing network 86. The capacitor C5 thereof then commences to discharge through the variable resistor R5, connected in shunt therewith, whereby the potential between the terminals 84 and 88 commences to decrease at a predetermined rate to gradually increase conduction through the valve 2V. Closure of the contacts CR2c completed the energizing circuit for the indicating lamp 52 to indicate that the motor is being accelerated from standstill toward full speed.

Since the potential to which the network 86 is charged is far greater than the cut-off potential of the vacuum valve 2V, and initial time interval elapses during the timing out of the network 86 before any change in conduction of the valve 2V occurs. This provides for an initial operation of the motor 1 at minimum voltage to permit its rotor to start rotating. At the end of this initial timing interval, the magnitude of the potential across the R-C network 86 will be reduced sufficiently to permit the valve 2V to conduct at first slightly and then more and more in accordance with the predetermined discharge pattern of the network 86. This provides for a gradual increase in a slope up of the voltage applied to the motor 1.

More specifically, the increase in current flow through the valve 2V causes a progressively increasing current to flow through the windings 36, 36A, and 36B to reduce the inductive reactance of the windings 30, 30A, and 30B of the inductive devices 32, 32A and 32B. This results in a gradual forward shift of the voltages applied to the transformer 1T, 1TA, and 1TB whereby the firing valves 1V, 1VA, and 1VB progressively fire the ignitrons I1, I2 and I3 earlier and earlier in the voltage wave to provide for an increasing voltage to the motor 1.

At some predetermined point in the discharge period of the R-C network 86, as determined by the variable resistor R6, the potential drop across valve 2V will become sufficiently low to enable the energizing winding 100 of the relay CR5 to become sufficiently energized to close the contacts CR5a and CR5b. Preferably, the adjustment of resistor R6 is such that the actuation of relay CR5 occurs when the reactance of reactors 32, 32A, and 32B is sufficiently reduced to cause the phase shifting circuits to fire the ignitrons susbtantially in phase with the line voltage, or 0° phase shift. Closure of contact CR5b completes a circuit in shunt with the now closed contacts CR1d without present effect, but closure of contacts CR5a completes an energizing circuit through the winding 60 of the control relay CR4 whereby relay CR4 is energized. Specifically, the energizing circuit for winding 60 extends from the bus B9 through the now closed contacts CR1c, winding 60, now closed contacts CR5a and conductor 62 to the bus B10. The resultant opening of contacts CR4a interrupts the current flow through the anode circuit of the valve 2V and closure of the contact CR4b completes a shunt circuit past the valve 2V through a variable resistor R7 whereby relay CR5 remains energized, the winding 100 being shunted with a capacitor to maintain relay CR5 operated during the transition period. This substitution of resistor R7 for tube 2V also occurs in the circuit of each of the windings 36, 36A, and 36B of the devices 32, 32A and 32B, so that the firing angle of the thyratrons is held at a value (such as 0° with respect to the individual phases) determined by the setting of variable resistor R7.

Opening of the contracts CR4c deenergizes the indicating or signal lamp 52 indicating that the accelerating interval of the starting apparatus has been completed. Closure of the contacts CR4d completes the energizing circuit for the winding 76 of the motor control switch MC whereby it closes its contacts a, b, c, and d and opens its contacts e, f, and g. Closure of the contacts a, b, and c directly connects the busses B1–B4, B2–B5, and B3–B6 together to shunt out the ignitron sets 2, 4, and 6 whereby the motor 1 is directly connected through the disconnect switch LS1 to the lines L1, L2, and L3. Closure of the contacts a, b, and c effectively terminates further conducting of the ignitrons I1–I6 since the anode potential thereof is reduced to the small value of the contact drop of the contacts a, b, and c.

Opening of the contacts e is without effect in the operation now being described since contacts CR1b are already open, but closure of contacts d energizes lamp 54, indicating that the motor 1 is connected directly to the lines L1, L2 and L3 by means of the control switch MC. Opening of the contacts f is without present effect since in normal operation the contacts TD2a and TDCRd will not have closed. Opening of the contacts g terminates further energization of the winding 72 thereby preventing the relay TD2 from completing its timing operation.

The magnitude of the resistance R6 should be such that the current flow through the winding 100 does not reach the critical value to cause the relay CR5 to close its contacts CR5a and CR5b until the valve 2V has attained a rate of conduction in which the inductive reactors 32, 32A, and 32B have attained a condition in which the ignitrons I1, I3, I5 are fired at substantially the zero point in the current wave to the motor 1. The magnitude of the resistance R7 is such that with the contact CR4b closed, the curernt flow through the winding 100 is sufficient to maintain the contacts CR5a and CR5b closed and the reactors 32, 32A, and 32B in such condition that the firing pulses supplied from the phase shifting networks 18, 18A, and 18B are phased to occur substantially at or before the zero point in the voltage wave to the motor 1.

The magnitude of the resistance R6 should also be such that with the contacts CR4a closed and the valve 2V nonconducting, the current flow through the winding 100 and the resistors R6 and R8 is insufficient to actuate the relay CR5.

When it is desired to terminate operation of the motor, the switch SW2 is momentarily opened. This disconnects the windings 56 and 58 from the bus B9 whereby further flow of energy thereto is terminated. Immediately upon deenergization of the winding 56, the relay CR1 opens its contacts CR1a, CR1c, and CR1d and closes its contacts CR1b. Opening of the contacts CR1a is without effect as long as the switch SW2 is held open but does prevent re-energization of the windings 56 and 58 upon re-closure of the switch SW2. Opening of the contacts CR1c deenergizes the winding 60 of the relay CR4 which relay now opens its contacts CR4b, CR4c and closes its contacts CR4a and CR4c. Opening of the contacts CR1c also renders the closure of the contacts CR1b ineffective to energize the fault-indicating lamp 66, upon re-closure of the contacts e of the motor control relay MC. Opening of contacts CR1d is without effect since contacts CR5b are now closed. Opening of the relay contacts CR4d deenergizes the energizing winding 76 of the motor control switch MC which thereupon opens its contacts a, b, and c to effectively re-insert the pairs of ignitrons 2, 4, and 6 in the supply circuit of the motor 1. Closure of the contacts CR4a and opening of the contacts CR4b returns the control of the phase shifting networks 18, 18A, and 18B to the valve 2V and the resistor R8. Since at this time the contacts CR2b remain open, the R-C network 86 will remain uncharged and the valve 2V will conduct the same current as when the relay CR5 became energized and the ignitrons I1, I3, and I5 will be fired early in their voltage waves, whereby the pairs of ignitrons 2, 4, and 6 continue to supply current to the motor 1. Closure of the contacts CR4c re-energizes the acceleration indicating lamp 52 indicating that the motor is being run through the ignitron sets 2, 4, and 6.

A predetermined time after termination of the flow of energy to the winding 58, the previously accumulated charge on the capacitor C1 will have dissipated itself through the winding 58 and the relay CR2 will not become deenergized to open its contacts CR2a and CR2c and close its contacts CR2b. Opening of contacts CR2a interrupts the anode circuit of valve 2V and leaves the phase shifting networks 18, 18A and 18B and relay CR5 subject to control by resistor R8. Closure of the contacts CR2b re-charges the network 86 to place a blocking bias upon the valve 2V preventing further conduction thereof, in readiness for the next operation. When placed under control of resistor R8, the relay CR5 will become deenergized opening its contacts CR5a and CR5b. Opening of the contacts CR5a is without present effect since the circuit therethrough was previously opened by opening of the contacts CR1c. Opening of the contacts CR5b, however, does deenergize the winding 74 of the relay CR3 whereby its contacts CR3a, CR3b, and CR3c open to terminate further firing of the ignitron sets 2, 4, and 6 in a manner described above. Termination of the further firing of the ignitron sets 2, 4, and 6 terminates further flow of energy to the motor 1 and the motor decelerates to a standstill. It will now be appreciated that the apparatus is returned to its original condition, ready for a subsequent operation.

In the event that the operation of the apparatus was faulty in that motor control switch MC did not become energized within the desired time interval, the relay TD2 will time out closing its contacts TD2a. This completes the energizing circuit for the winding 70 of the time delay control relay TDCR whereby the contacts TDCRa and TDCRc thereof open and the contacts TDCRb and TDCRd close. Opening of the contacts TDCRa deenergizes the circuit through the windings 56 and 58 of the relays CR1 and CR2 with the same effect as if the stop switch SW2 had been opened. Closure of the contacts TDCRb completes a shunting circuit about the contacts CR1c of the relay CR1 whereby the conductor 68 remains connected to the bus B9. This permits the fault signal lamp 66 to become illuminated and the relay TDCR to remain energized through its lock-in contacts TDCRd. The apparatus may be reset by momentarily opening the reset switch SW3.

While in conformance with the patent statutes there has been illustrated a preferred embodiment of the invention, it is to be understood that various modifications may be made therein and still come within the intended scope of the hereinafter appended claims.

What is claimed is:

1. In a control circuit for supplying power to a load device from a three-phase power line, said load device having a plurality of input terminals, the combination which comprises two banks of ignitron tubes connected between said line and said input terminals to provide going and return current paths for load current, adjustable phasing means connected in circuit with the ignitor electrodes of the nigitrons in one of said banks for initiating the conduction periods of such ignitrons in predetermined phase relation to the power-line voltage, and charge-responsive means connected in circuit respectively between said input terminals and the ignitor electrodes of the ignitrons in said other bank operative to initiate conduction periods of said other ignitrons in automatic response to the accumulation of charge on said input terminals, whereby said other ignitrons provide timed return paths for load current flowing through said load device via the ignitrons in said first bank.

2. In a motor-control circuit for supplying power to a three-phase motor from a three-phase power line, said motor having a plurality of input terminals, the combination which comprises two banks of ignitron tubes connected between said line and said motor terminals to provide going and return current paths for motor current, adjustable phasing means connected in circuit with the ignitor electrodes of the ignitrons in one of said banks for initiating the conduction periods of such ignitrons in predetermined phase relation to the power-line voltage, and means comprising a plurality of rectifiers respectively connected in circuit between said motor terminals and the ignitor electrodes in said other bank operative automatically to initiate conduction periods of such respective other ignitrons responsively to accumulation of charge on said respective motor terminals, whereby said other ignitrons provide timed return paths for motor current flowing through said motor via the ignitrons in said first bank.

3. In a motor-control circuit for supplying power to a three-phase motor from a three-phase power line, said motor having a plurality of input terminals, the combination which comprises three pairs of ignitron tubes, the tubes in each pair being connected back-to-back and each such pair being connected between one of the conductors of said power line and one of said input terminals, substantially as shown and described, phase-adjustable voltage-supply means connected in circuit with the ignitor electrode of one ignitron in each of said pairs for controllably initiating conduction periods in said ignitrons during predetermined portions of the power-line voltage cycle, and a rectifier means for each of the other ignitrons, each of said rectifiers being connected in circuit between a motor input terminal and the ignitor element of the ignitron with which such rectifier is associated, such rectifiers being respectively operative to conduct charge from said respective motor terminals to such respective ignitor electrodes, whereby conduction periods are initiated automatically in such other ignitrons in timed relationship to provide return paths for motor current flowing through said motor via said first-mentioned ignitrons.

4. In a control system for supplying power to a load device from a polyphase power line, said load device having a plurality of input terminals, the combination which comprises two banks of electronic tubes connected between said line and said input terminals to provide going and return current paths for load current and each having control electrodes, adjustable phasing means connected in circuit with the control electrodes of the tubes in one of said banks for initiating the conduction periods of such tubes in predetermined phase relation to the power-line voltage, and charge responsive means connected in circuit respectively between said input terminals and the control electrodes of the tubes in said other bank operative to initiate conduction periods of said other tubes in automatic response to the accumulation of charge on said input terminals, whereby said other tubes provide timed return paths for load current flowing through said load device via the tubes in said first bank.

5. In a motor-control system for supplying power to a polyphase motor from a polyphase power line, said motor having a plurality of input terminals, the combination which comprises two banks of electronic tubes connected between said line and said motor terminals to provide going and return current paths for motor current and each having control electrodes, adjustable phasing means connected in circuit with the control electrodes of the tubes in one of said banks for initiating the conduction periods of such tubes in predetermined phase relation to the power-line voltage, and means connected in circuit between said motor terminals and the control electrodes of the other tubes operative automatically to initiate conduction periods of such other tubes in response to the accumulation of charge on said respective motor terminals, whereby said other tubes provide timed return paths for motor current flowing through said motor via the tubes in said first bank.

6. In a motor-control system for supplying power to a polyphase motor from a polyphase power line, said motor having a plurality of input terminals, the combination which comprises a plurality of pairs of electronic tubes, each having a control electrode, one pair for each said phase, the tubes in each pair being connected back-to-back and each such pair being connected between one of the conductors of said power line and one of said input terminals, phase-adjustable voltage-supply means connected in circuit with the control electrode of one tube in each of said pairs for controllably initiating conduction periods in said tubes during predetermined portions of the power-line voltage cycle, and a rectifier means for each of the other tubes, each of said rectifiers being connected in circuit between a motor input terminal and the control electrode of the tube with which such rectifier is associated, such rectifiers being respectively operative to conduct charge from said respective motor terminals to such respective control electrodes, whereby conduction periods are initiated automatically in such other tubes in timed relationship to provide return paths for motor current flowing through said motor via said first-mentioned tubes.

7. In a control circuit for supplying power to a load device from a polyphase power line, said load device having a plurality of input terminals, the combination which comprises two banks of electronic tubes connected between said line and said input terminals to provide going and return current paths for load current, initiating means for initiating the conduction periods of said tubes in predetermined phase relation to the power line voltage and for progressively lengthening such conduction periods to thereby increase the effective voltage applied to the load, contactor mechanism operable to by-pass said banks of tubes, said contactor mechanism being automatically actuable at a predetermined stage of said increase in effective voltage, and safety mechanism operable to disconnect said load from said power line and, until reset, to prevent reconnection thereof in the event said contactor mechanism fails to operate properly.

8. A motor-control circuit according to claim 3 wherein each of said rectifiers means comprises a diode having an anode and a cathode, the anode of each such diode being connected in circuit with a motor terminal and the cathode of each such diode being connected in circuit with the ignitor electrode of the ignitron associated therewith.

9. In a motor-control circuit for supplying power to a three-phase motor from a three-phase power line, said motor having a plurality of input terminals, the combination which comprises three pairs of ignitron tubes, the tubes in each pair being connected back-to-back and each such pair being connected between one of the conductors of said power line and one of said input terminals, substantially as shown and described, a grid-controlled rectifier tube associated with one ignitron in each of said pairs, each of said rectifier tubes having a cathode, an anode, and a grid, the anode of each such rectifier being connected in circuit with the anode of its associated ignitron and the cathode of each such rectifier tube being connected in circuit with the ignitor electrode of such associated ignitron, a diode rectifier associated with each of the other ignitrons in said pairs, each of said diode rectifiers having an anode and a cathode and having its anode connected in circuit with the anode of its associated ignitron and its cathode connected in circuit with the ignitor electrode of such ignitron, and controllable phase voltage-supply means for supplying control voltage to the grids of said grid-controlled rectifier tubes for initiating conduction periods of said first-mentioned ignitron tubes during predetermined portions of the power-line voltage cycle, said diode rectifiers being operative responsively to accumulation of charge on said motor terminals to initiate automatically conduction periods in said last-mentioned ignitron tubes to provide timed return paths for motor current flowing through said motor via said first-mentioned ignitrons.

10. In a motor control system for supplying power to a three-phase motor from a source of three-phase alternating voltage, said motor having three input terminals, the combination which comprises three pairs of reversely connected periodically conductive ignitron tubes, each said pair being connected between said source and an individual one of said motor terminals, said pairs providing going and return current paths for motor current, each of said tubes having an ignitor electrode, phasing means connected in circuit with the ignitor electrodes of one of the ignitrons of each of said pairs for rendering said ones of said ignitrons conductive for portions of half periods of said voltage, a starting switch, circuit means including said phasing means and operative in response to and after operation of said switch for progressively increasing said portions as a continuous function of time and at a selectable and controlled time rate, and means including charge-responsive means connected in circuit respectively between said input terminals and the ignitor electrodes of the other ignitrons operative to initiate conduction periods of said other ignitrons in automatic response to the accumulation of charge on said input terminals.

11. In a control circuit for supplying power to a three-phase alternating current motor from a three-phase power line, said motor having three input terminals, the combination which comprises two banks of ignitron tubes connected between said line and said input terminals to provide going and return current paths for motor current through each of the phases of the motor, means connected in circuit with the ignitor electrodes of the ignitrons in one of said banks for initiating the conduction periods of such ignitrons, and charge-responsive means connected in circuit respectively between the input terminals and the ignitor electrodes of the ignitrons in said other bank operative to initiate conduction periods of said other ignitrons in automatic response to the accumulation of charge in each of said input terminals, whereby said other ignitrons provide timed return paths for load current flowing through each of the phases of the motor via the ignitrons in the first bank.

12. In a motor control system for supplying power to a three-phase motor from a source of three-phase alternating voltage, said motor having three input terminals, the combination which comprises three pairs of reversely connected periodically conductive electronic valve means, each said pair being connected between said source and an individual one of said motor terminals, said pairs providing going and return current paths for motor current, each of said valve means having a control electrode, phasing means connected in circuit with the control electrodes of one of the valve means of each of said pairs for rendering said ones of said valve means conductive for portions of half periods of said voltage, a starting switch, circuit means including said phasing means and operative in response to and after operation of said switch for progressively increasing said portions as a continuous function of time and at a selectable and controlled time rate, and means including charge-responsive means connected in circuit respectively between said input terminals and the control electrodes of the other valve means operative to initiate conduction periods of said other valve means in automatic response to the accumulation of charge on said input terminals.

13. In a motor control system for supplying power to a three-phase motor from a source of three-phase alternating voltage, said motor having three input terminals, the combination which comprises three pairs of reversely connected periodically conductive ignitron tubes, each said pair being connected between said source and an individual one of said motor terminals, said pairs providing going and return current paths for motor current, each of said tubes having an ignitor electrode, phasing means connected in circuit with the ignitor electrodes of one of the ignitrons of each of said pairs for rendering said ones of said ignitrons conductive for portions of half periods of said voltage, a starting switch, circuit means including said phasing means and operative in response to and after operation of said switch for progressively increasing said portions as a continuous function of time and at a selectable and controlled time rate, and means including charge-responsive means connected in circuit respectively between said input terminals and the ignitor electrodes of the other ignitrons operative to initiate conduction periods of said other ignitrons in automatic response to the accumulation of charge on said input terminals.

14. In a control system for supplying power to a load device from a polyphase power line, said load device having a plurality of input terminals, the combination which comprises two banks of electronic valve means connected between said line and said input terminals to provide going and return current paths for load current and each having control electrodes, adjustable phasing means connected in circuit with the control electrodes of the valve means in one of said banks for initiating the conduction periods of such valve means in predetermined phase relation to the power-line voltage, and charge-responsive means connected in circuit respectively between said input terminals and the control electrodes of the valve means in said other bank operative to initiate conduction periods of said other valve means in automatic response to the accumulation of charge on said input terminals, whereby said other valve means provide timed return paths for load current flowing through said load device via the valve means in said first bank.

15. In a control system for supplying power to a load device from a polyphase power line, said load device having a plurality of input terminals, the combination which comprises two banks of electronic valve means connected between said line and said input terminals to provide going and return current paths for load current and each having control electrodes, means connected in circuit with the control electrodes of the valve means in one of said banks for initiating the conduction periods of such valve means in predetermined phase relation to the power-line voltage, and charge-responsive means connected in circuit respectively between said input terminals and the control electrodes of the valve means in said other bank operative to initiate conduction periods of said other valve means in automatic response to the accumulation of charge on said input terminals, whereby said other valve means provide timed return paths for load current flowing through said load device via the valve means in said first bank.

16. In a control system for controllably supplying power to an alternating current energized load device having first and second terminals from an alternating current power line having first and second terminals, the combination which comprises first means including controllable electronic valve means connected between the first terminal of the line and the first terminal of the load device for applying pulses of energy of selectively variable duration from the line to the load device, second means including controllable electronic valve means connected between the second terminal of the line and the second terminal of the load device for applying pulses of energy of selectively variable duration from the line to the load device, means including charge-responsive means connected between the second terminal of the load device and the second terminal of the line for automatically connecting the second terminal of the load device to the second terminal of the source in automatic response to the accumulation of charge on the second terminal of the load device resulting from the pulses of energy applied to the load device via said first means for providing timed return paths for load current flowing through the load device via said first means, and means including charge responsive means connected between the first terminal of the load device and the first terminal of the source for automatically connecting the first terminal of the load device to the first terminal of the line in automatic response to the accumulation of charge on the first terminal of the load device resulting from the pulses of energy applied to the load device via said second means for providing timed return paths for load current flowing through the load device via said second means.

17. In a control system for controllably supplying polyphase power to a polyphase load device having first, second and third terminals from a polyphase power line having first, second and third terminals, the combination which comprises first, second and third controlled means each including controllable electronic valve means connected between the first, second, and third terminals of the line, respectively, and the first, second and third terminals of the load device, respectively, for applying pulses of energy of selectively variable duration from the line to the load device, and fourth, fifth and sixth means each including charge responsive means connected between the first, second and third terminals of the load device, respectively, and the first, second and third terminals of the line, respectively, for automatically connecting those respective terminals of the load device to the respective terminals of the source in automatic response to the accumulation of charges on those respective terminals of the load device resulting from the pulses of energy applied to the load device via said first, second and third means for providing timed return paths for load current flowing through the device via said controlled means.

References Cited in the file of this patent

UNITED STATES PATENTS

| | | |
|---|---|---|
| 2,288,339 | Willis | June 30, 1942 |
| 2,663,834 | Large et al. | Dec. 22, 1953 |
| 2,665,404 | Elliot | Jan. 5, 1954 |
| 2,703,860 | Large et al. | Mar. 6, 1955 |
| 3,045,163 | Collom | July 17, 1962 |